United States Patent [19]

Anderson

[11] Patent Number: 5,354,014
[45] Date of Patent: Oct. 11, 1994

[54] SYSTEM FOR DE-ICING AIRPLANES

[75] Inventor: Thomas M. Anderson, Hugo, Minn.

[73] Assignee: Schwing America, Inc., Minneapolis, Minn.

[21] Appl. No.: 54,044

[22] Filed: Apr. 27, 1993

[51] Int. Cl.$^5$ ............................................. B64D 15/10
[52] U.S. Cl. ................................ 244/134 C; 244/134 R; 134/123
[58] Field of Search ............... 244/134 R, 134 C; 134/45, 123

[56] References Cited

U.S. PATENT DOCUMENTS

| | | | |
|---|---|---|---|
| 3,533,395 | 10/1970 | Yaste | 134/45 |
| 3,533,422 | 10/1970 | Alimanestiano | 134/45 |
| 3,612,075 | 10/1971 | Cook | 134/123 |
| 3,645,282 | 2/1972 | Kurronen | 134/45 |
| 4,191,348 | 3/1980 | Holwerda | 244/134 C |
| 4,378,755 | 4/1983 | Magnusson et al. | 244/134 C |
| 4,634,084 | 1/1987 | Magnusson | 244/134 C |
| 4,654,087 | 3/1987 | Fujita et al. | 15/21.1 |
| 4,933,016 | 6/1990 | Carlson | 134/45 |
| 5,060,887 | 10/1991 | Kean | 244/134 C |
| 5,104,068 | 4/1992 | Krilla et al. | 244/134 C |
| 5,161,753 | 11/1992 | Vice et al. | 244/134 C |

FOREIGN PATENT DOCUMENTS

2343389  3/1974  Fed. Rep. of Germany ... 244/134 C

Primary Examiner—Michael S. Huppert
Assistant Examiner—Anne E. Bidwell
Attorney, Agent, or Firm—Kinney & Lange

[57] ABSTRACT

A system for de-icing aircraft in a de-icing area includes a first recessed storage area located substantially below ground level on a first side of the de-icing area. A first spraying boom, having at least one boom section, is used to apply de-icing solution to surfaces of aircraft. A first spray nozzle, for applying de-icing solution to surfaces of aircraft, is supported by the first spraying boom. The first spraying boom may be raised out of the first recessed storage area when an aircraft needs de-icing and lowered into the first recessed storage area for storage when aircraft de-icing is complete.

22 Claims, 5 Drawing Sheets

SYSTEM FOR DE-ICING AIRPLANES

BACKGROUND OF THE INVENTION

The present invention relates to systems for de-icing aircraft. In particular, the present invention relates to an aircraft de-icing system which utilizes booms, retractable into boom storage compartments located substantially below ground level on the taxiway, to automatically de-ice an aircraft.

It is well known that accumulation of snow, ice or frost on the surfaces of an aircraft can have an adverse effect on the aircraft's performance, particularly during take-off. Unless accumulations of these elements are removed from the surfaces of the aircraft prior to take-off, the safety of the passengers and crew will be jeopardized.

A common problem in the de-icing of aircraft is the re-accumulation of snow, ice or frost on the surfaces of an aircraft during the delay period between de-icing and take-off. Because of this problem, it is advantageous to reduce the delay period so that there is not sufficient time for snow, ice or frost to re-accumulate on the surfaces of the aircraft. One method of reducing the delay period between de-icing and take-off is to position the de-icing station on a taxiway bypass close to the take-off runway so that de-iced aircraft do not have to travel a long distance between the de-icing station and the runway.

An example of a de-icing system which is positioned on a taxiway bypass near the take-off runway is shown in Vice et al., U.S. Pat. No. 5,161,753, entitled "AIRPLANE PROTECTIVE AND MAINTENANCE SYSTEM." The system disclosed in Vice et al. includes a portable structure which may be shuttled between a location on taxiway bypass adjacent the take-off runway during cold weather and a remote location away from the take-off runway during warm weather. Although the de-icing structure disclosed in Vice et al. is located near the take-off runway, reducing the delay period between de-icing and take-off, it still has several disadvantages. First, even though the structure is located on a taxiway bypass which is near the take-off runway, a de-iced aircraft will still have to travel a significant distance from the de-icing station to the take-off runway, and may have to wait in line behind other aircraft before take-off. During the travel time and waiting period, snow, ice or frost may re-accumulate on the surfaces of the aircraft.

A second disadvantage of systems like the one disclosed in Vice et al. is that it can be unsafe to have rigid structures positioned close to runways for any significant period of time. Even though the structure disclosed in Vice et al. can be shuttled to a remote location during warm weather, its semi-permanent location near the runway creates increased risks to airport traffic. A third disadvantage of systems like those disclosed in Vice et al. is that large permanent or semi-permanent structures take up a considerable amount of space. This is especially disadvantageous at airports where the efficient use of space is critical.

Another common problem in the de-icing of aircraft is incomplete or improper de-icing as a result of operator error. If the operator of a de-icing station forgets to de-ice a portion of the aircraft, or does not de-ice portions of the aircraft thoroughly enough, the flight characteristics of the aircraft may be adversely affected to the point that the safety of the passengers and crew is jeopardized.

SUMMARY OF THE INVENTION

The present invention is based upon the recognition that an aircraft de-icing system, with at least one spraying boom located on the side of a de-icing area immediately adjacent a take-off runway and which is retractable into a boom storage compartment when an aircraft is not being de-iced, offers increased safety, more efficient use of limited airport space, and the reduction of operator errors in the application of de-icing solution to aircraft.

The system for de-icing aircraft of the present invention includes a first recessed storage area located substantially below ground level on a first side of the de-icing area. The system also includes a first spraying boom, having at least one boom section, which may be raised out of the first recessed storage area when an aircraft needs de-icing and lowered into the first recessed storage area when aircraft de-icing is completed. One or more spray nozzles are supported by the first spraying boom.

In one preferred embodiment of the present invention, a sensor indicates when an aircraft is in proper position within the de-icing area for the first spraying boom and the one or more spray nozzles to apply de-icing solution to surfaces of the aircraft.

In a second preferred embodiment, a signal is sent from the aircraft to a controller, which identifies the model of the aircraft. The first spraying boom and the one or more spray nozzles are controlled based upon the signal so that surfaces of the aircraft are automatically de-iced.

In a third embodiment of the present invention, de-icing solution run-off is collected. The collected de-icing solution run-off is recycled and stored for subsequent application to surfaces of aircraft.

In a fourth preferred embodiment of the present invention, the first recessed storage area is covered while the first spraying boom is stored within.

DETAILED DESCRIPTION OF THE PREFERRED EMBODIMENTS

Figure 1:
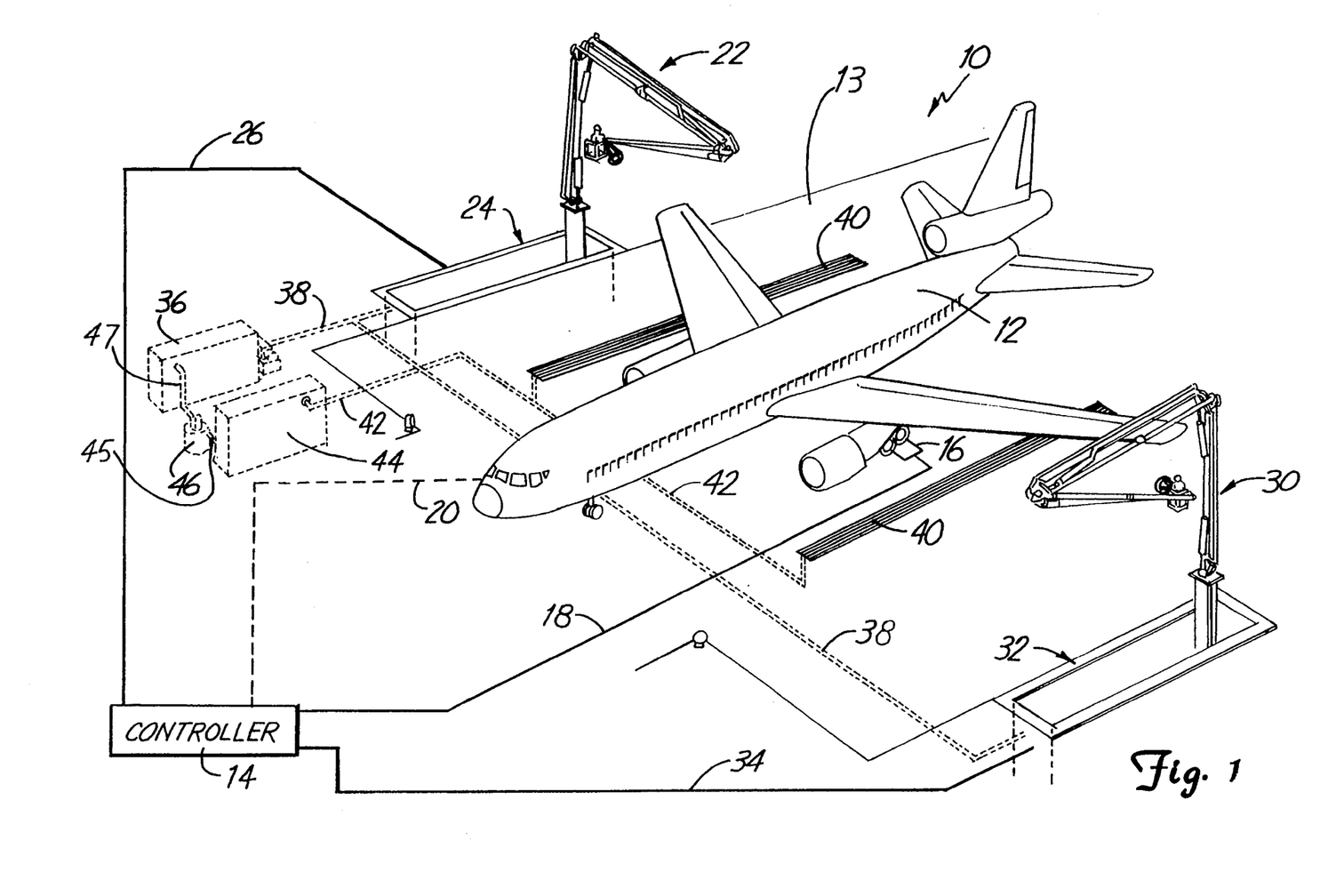
FIG. 1 is a perspective view of the system for de-icing airplanes of the present invention.

FIG. 1 shows a preferred embodiment of aircraft de-icing system 10 of the present invention. Aircraft de-icing system 10 is used to de-ice airplane 12 on taxiway 13 before take-off. System 10 includes controller 14, sensing plate 16, communication line 18, communication link 20, spraying boom 22, boom storage compartment 24, communication line 26, spraying boom 30, boom storage compartment 32, communication line 34, supply tank 36, supply pipes 38, drainage gates 40, return pipes 42, holding tank 44, pipe 45, recycling unit 46 and pipe 47.

Taxiway 13 may be a taxiway bypass or a taxiway located immediately adjacent a take-off runway. In other embodiments, system 10 is not located on taxiway 13, but rather on a de-icing area in a more remote section of the airport. However, in preferred embodiments, system 10 is located on taxiway 13 immediately adjacent a take-off runway in order to reduce the delay between de-icing and take-off.

Controller 14, which in a preferred embodiment is a microprocessor-based computer including associated memory and associated input/output circuity, monitors the de-icing operations of system 10. In other preferred embodiments of the present invention, controller 14 includes a programmable logic controller (PLC) instead of a computer.

Sensing plate 16 is located on taxiway 13 and is coupled to controller 14 through communication line 18. In preferred embodiments, sensing plate 16 is an electromechanical sensor, a photo-electric sensor, or other type of sensor capable of sensing the position of airplane 12. As the wheels of airplane 12 pass over sensing plate 16, electrical signals are sent through communication line 18 to controller 14, indicating that airplane 12 is in proper position for de-icing.

Controller 14 communicates with the crew of airplane 12 by sending signals through communication link 20. The crew of airplane 12 communicates with controller 14 by sending signals through communication link 20 as well. Communication link 20 represents radio or other communications between controller 14 and airplane 12. In other preferred embodiments, controller 14 communicates with an on-board computer of airplane 12 rather than with the flight crew.

One end of spraying boom 22 is positioned inside of boom storage compartment 24 which is located substantially below ground level on a first side of taxiway 13. As shown in FIG. 1, boom 22 may be extended out of compartment 24 when an aircraft needs de-icing. Boom 22 is also retractable into compartment 24 for storage when an aircraft is not being de-iced. As will be discussed later in greater detail, retraction of boom 22 into compartment 24 for storage while aircraft are not being de-iced provides increased safety as well as a more efficient use of limited airport space. Boom 22 and controller 14 communicate through communication line 26 which is coupled between controller 14 and the base of boom 22 in compartment 24.

In other preferred embodiments, compartment 24 may be any type of recessed storage area in which boom 22 may be retracted for storage when an aircraft is not being de-iced. Boom 22 and compartment 24 will be discussed later in greater detail.

Spraying boom 30, which is shown extending outward from boom storage compartment 32, is preferably the same as boom 22. Similarly, compartment 32 is preferably the same as compartment 24, except that it is positioned on a second side of taxiway 13, opposite from compartment 24. Boom 30 and controller 14 communicate through communication line 34 which is coupled between controller 14 and the base of boom 30 in compartment 32. Boom 30 and compartment 32 are intended to function the same as boom 22 and compartment 24, and therefore, detailed discussions of boom operations are frequently limited to boom 22 and compartment 24, but are intended to apply to boom 30 and compartment 32 as well.

Supply tank 36 stores one or more de-icing fluids which are supplied to spraying booms 22 and 30 through supply pipes 38. Drainage gates 40, which in preferred embodiments are positioned on taxiway 13 between boom storage compartments 24 and 32, collect runoff de-icing solution sprayed by booms 22 and 30. Runoff de-icing solution collected by drainage gates 40 flows through return pipes 42 to holding tank 44. Holding tank 44 is connected, through pipe 45, to recycling unit 46. Recycling unit 46 recycles the collected de-icing solution in holding tank 44. Recycled de-icing solution is then pumped from recycling unit 46, through pipe 47, to supply tank 36 for subsequent use in de-icing aircraft.

The sequence of de-icing operations of system 10 is as follows. The crew of airplane 12 maneuvers the aircraft down taxiway 13 until its tires are positioned over sensing plate 16. When the tires of airplane 12 are positioned over plate 16, plate 16 sends a signal through communication line 18 to controller 14, indicating that airplane 12 is in position to be de-iced. Controller 14 then sends the crew of airplane 12 a signal through communication link 20 which directs the crew to stop airplane 12 in that position. The crew of airplane 12 next sends a signal to controller 14 through communication link 20, indicating the model type of airplane 12 and instructing controller 14 to proceed with de-icing operations.

In preferred embodiments, controller 14 has information, stored in its associated memory, relating to the locations and dimensions of the surfaces of a plurality of aircraft. After receiving the signal from the crew of airplane 12 indicating the airplane model type, controller 14 accesses the stored information relating to the model type of airplane 12. Next, control signals are sent to booms 22 and 30 through communication lines 26 and 34. The control signals control the movements of booms 22 and 30 so that de-icing solution is automatically applied to the surfaces of airplane 12. Because the position of airplane 12 is known, and because the dimensions of airplane 12 are stored and used to control the movements of booms 22 and 30, airplane 12 may be de-iced with decreased opportunity for human error.

Figure 2:
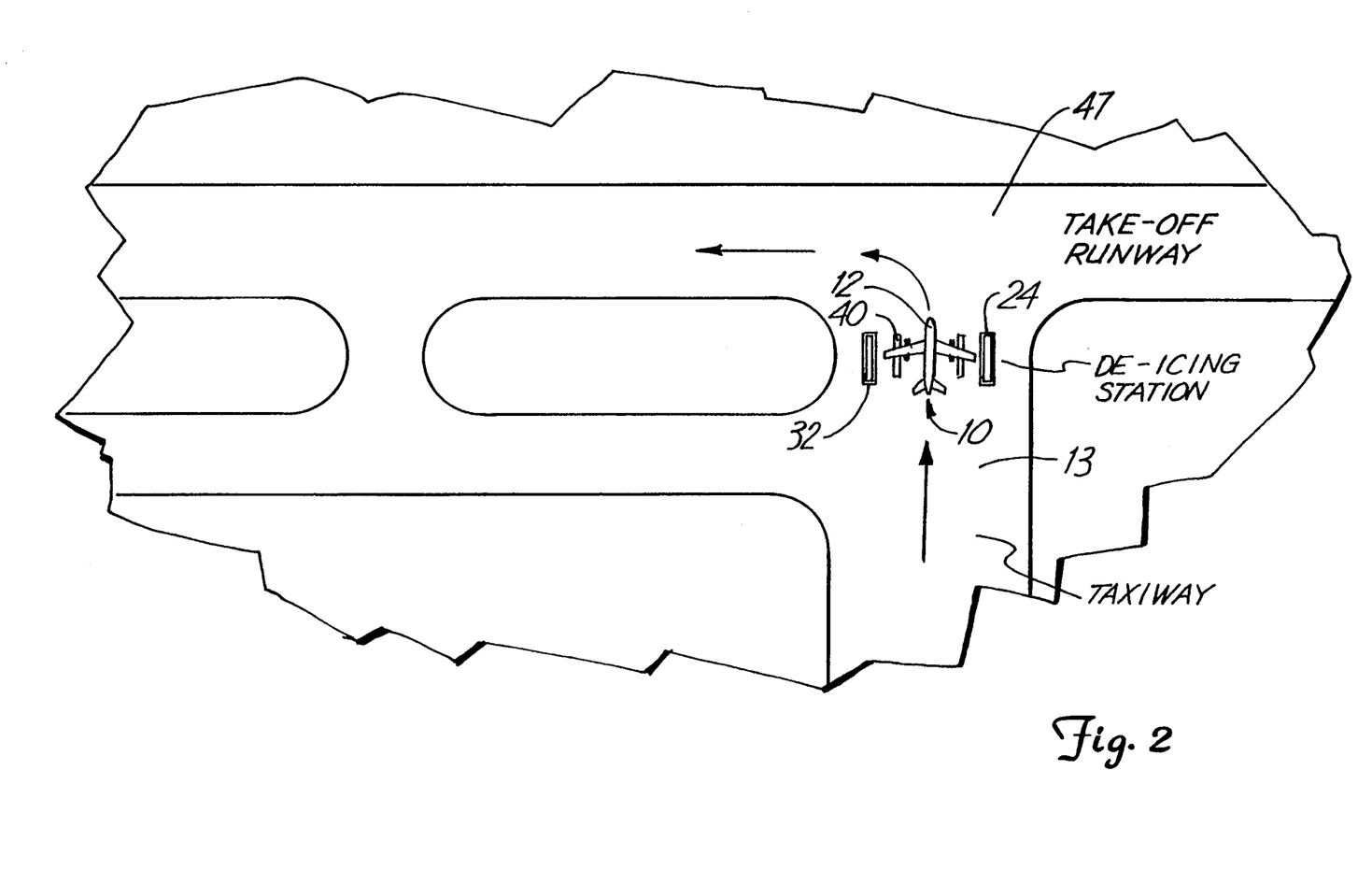
FIG. 2 is a top view of the system for de-icing airplanes shown in FIG. 1, located on a taxiway immediately adjacent a take-off runway.

FIG. 2 shows system 10 located on taxiway 13 immediately adjacent take-off runway 47. As shown, booms 22 and 30 are retracted inside compartments 24 and 32 for storage. Controller 14, which can be located at a position remote from the rest of system 10, is also not shown.

As discussed above, after airplane 12 is positioned over sensing plate 16, the crew or an onboard computer communicates information through communication link 20 to controller 14 indicating the model type of airplane 12 and directing controller 14 to begin de-icing operations. Controller 14 then accesses data from its associated memory relating to the dimensions of the particular airplane model identified. Using accessed data, controller 14 generates control signals which cause booms 22 and 30 to extend from compartments 24 and 32 and to automatically de-ice the surfaces of airplane 12. De-icing solution run-off is collected by grates 40 beneath airplane 12, and is recycled in the manner described above.

After de-icing is completed, booms 22 and 30 are retracted into compartments 24 and 32. At this point, airplane 12 is first in cue for take-off, and is already in a position immediately adjacent take-off runway 47. By positioning system 10 on taxiway 13 immediately adjacent take-off runway 47, the delay period between de-icing of airplane 12 and take-off may be greatly reduced. This reduces the time during which snow, ice or frost may re-accumulate on the surfaces of airplane 12, and therefore reduces the risks associated with re-accumulation of these elements.

Figure 3:
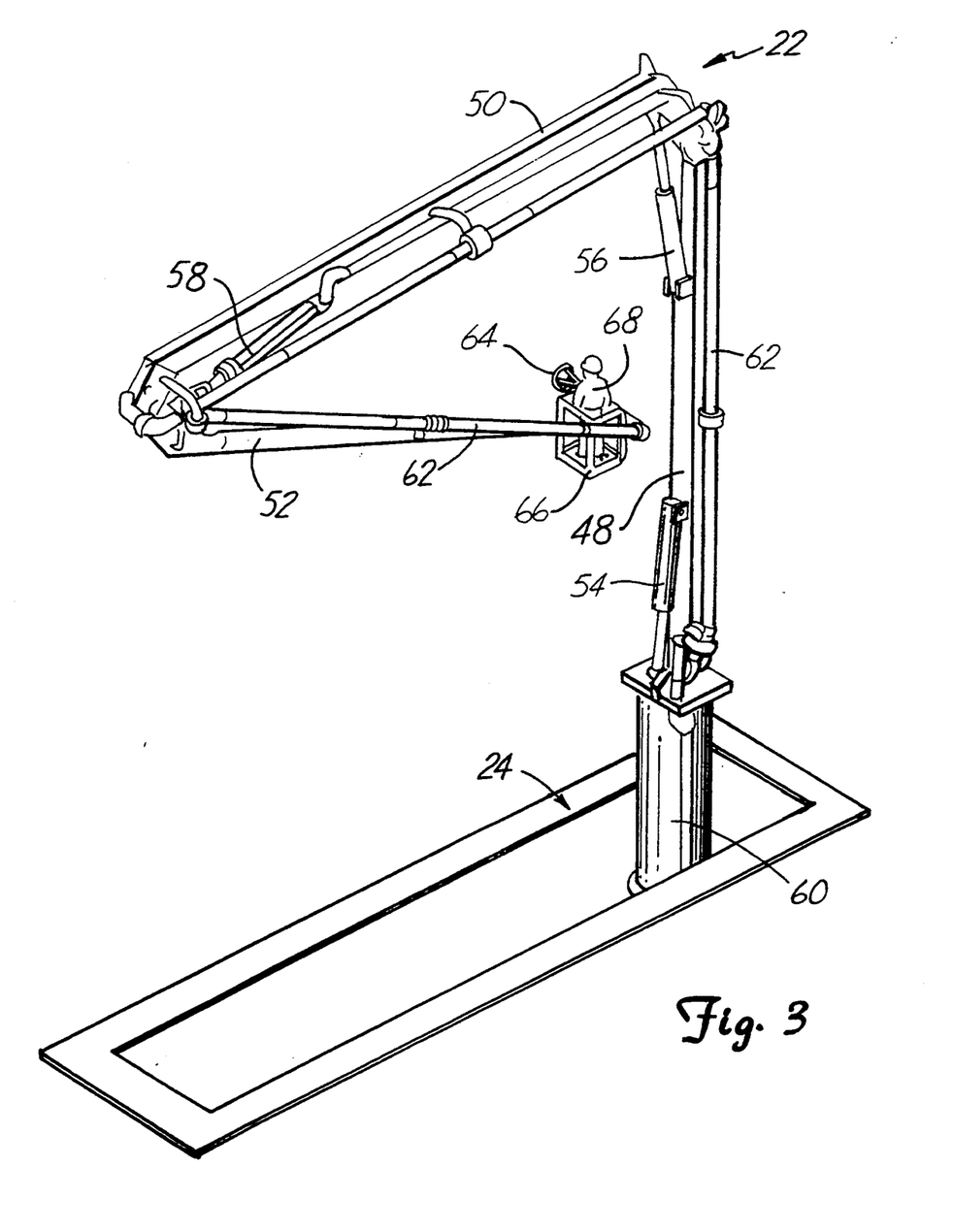
FIG. 3 is a perspective view of a spraying boom and boom storage compartment in accordance with the present invention.

FIG. 3 shows boom 22 and compartment 24 in more detail. Boom 22 includes boom sections 48, 50 and 52, pistons/cylinders 54, 56 and 58, boom base or support 60, hose or pipeline 62, spray nozzle 64 and operator basket 66. Although boom 22 includes boom sections 48–52, it should be noted that in other embodiments, boom 22 could have varying numbers of boom sections.

A first end of boom section 48 is movably connected to boom support 60. In preferred embodiments, the first end of boom section 48 is both rotatably and pivotally connected to support 60. A second end of boom section 48 is movably connected to a first end of boom section 50. Similarly, a first end of boom section 52 is movably connected to a second end of boom section 50.

Hydraulic piston/cylinder 54 is connected both to boom section 48 and to support 60 so that movement of the piston within the cylinder of piston/cylinder 54 causes boom section 48 to move relative to support 60. Piston/cylinder 56 is connected both to boom section 48 and to boom section 50 so that movement of the piston within the cylinder of piston/cylinder 56 causes boom section 50 to move relative to boom section 48. Finally, piston/cylinder 58 is connected to boom section 50 and to boom section 52 so that movement of the piston within the cylinder in piston/cylinder 58 causes boom section 52 to move relative to boom section 50.

While aircraft are not being de-iced, support 60 is in a lowered position within compartment 24 and boom 22 is folded for storage. Prior to applying de-icing solution to the surfaces of an aircraft, support 60 is raised out of compartment 24 and boom 22 is extended towards the surfaces of the aircraft. Raising support 60 out of compartment 24 allows boom 22 to extend further towards surfaces of the aircraft. However, in other preferred embodiments, support 60 is not raised out of compartment 24, but rather, boom 22 is extended out of compartment 24 without raising support 60. In yet other preferred embodiments, support 60 pivots within compartment 24 to allow boom 22 to reach all necessary surfaces of the aircraft.

Pipeline 62, which is attached to boom sections 48–52, is connected to supply pipes 38 which supply booms 22 and 30 with de-icing solution. When de-icing an aircraft, hydraulic pistons/cylinders 54–58 are manipulated so that boom sections 48–52 extend towards the surfaces of the aircraft with spray nozzle 64 in position to apply de-icing solution to the surface. De-icing solution is then pumped through pipeline 62 and out of spray nozzle 64. Spray nozzle 64 could, in other embodiments, be replaced with a series of spray nozzles spaced apart along the length of boom sections 48–52.

Operator basket 66 is connected to a second end of boom section 52. Operator 68 is shown positioned in operator basket 66. In preferred embodiments, movement of boom 22 is controlled automatically by controller 14, and is dependent upon the model of aircraft being de-iced. However, in other embodiments, boom 22 may be manually controlled as well. In these other embodiments, operator 68 controls the movement of boom 22 while positioned in operator basket 66.

Figure 4:
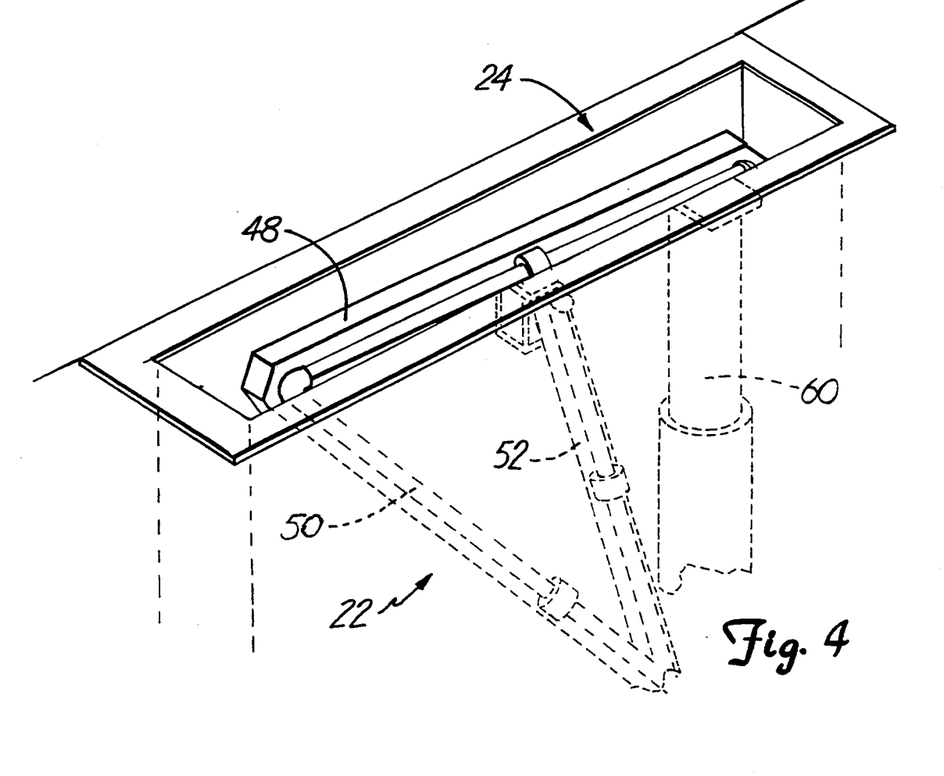
FIG. 4 is a perspective view of the spraying boom and boom storage compartment shown in FIG. 3, with the spraying boom housed inside the boom storage compartment.

FIG. 4 shows boom 22 retracted into compartment 24 for storage during a period when an aircraft is not being de-iced. In one preferred embodiment discussed above, to retract boom 22 into compartment 24, boom sections 48–52 are folded and boom support 60 is lowered down into compartment 24. While stored in compartments 24 and 32, booms 22 and 30 are substantially below ground level. In addition to saving space, storing booms 22 and 30 substantially below ground level provides increased safety for aircraft on the taxiway, landing runway or take-off runway.

Figure 5:
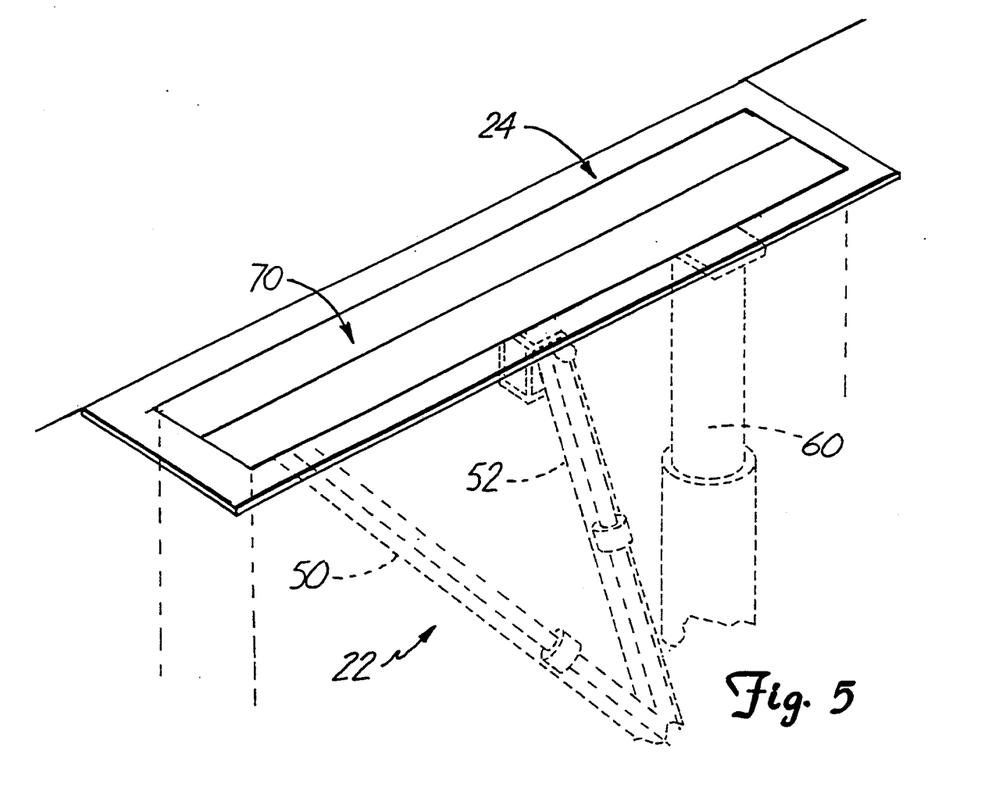
FIG. 5 is a perspective view of the boom storage compartment housing a spraying boom shown in FIG. 4, with a cover over the opening of the boom storage compartment.

FIG. 5 shows boom 22 retracted into compartment 24 as in FIG. 4, but with cover 70 blocking the opening to compartment 24. Cover 70 provides increased safety by preventing airport workers, airplane wheels and other vehicle wheels from falling into or getting stuck in the opening of compartment 24. In addition to providing increased safety for workers, passengers and vehicles, cover 70 protects boom 22 and compartment 24 as well. Cover 70 protects boom 22 from damage caused by an airplane or other vehicle with wheels that might fall into the opening of compartment 24. Cover 70 also protects boom 22 and compartment 24 from weather elements such as rain, sleet or snow during time periods when an aircraft is not being de-iced. In preferred embodiments, controller 14 generates control signals which cause cover 70 to block the opening to compartment 24 when an airplane is not being de-iced. However, in other embodiments, cover 70 could be manually placed to block the opening of compartment 24.

Although the present invention has been described with reference to preferred embodiments, workers skilled in the art will recognize that changes may be made in form and detail without departing from the spirit and scope of the invention.

What is claimed is:

1. A system for de-icing aircraft in a de-icing area, the system comprising:
   a first recessed storage area, the first recessed storage area being located substantially below ground level on a first side of the de-icing area;
   a first spraying boom for use in applying de-icing solution to surfaces of aircraft, the first spraying boom having at least one boom section;
   first means for applying de-icing solution to surfaces of aircraft, the first means for applying being supported by the first spraying boom; and
   at least one piston/cylinder combination for raising the first spraying boom out of the first recessed storage area when an aircraft needs de-icing and for lowering the first spraying boom into the first recessed storage area for storage when aircraft de-icing is completed, each piston/cylinder combination being connected to at least one boom section so that the first spraying boom may be raised out of or lowered into the first recessed storage area by moving each piston to a predetermined position within its respective cylinder.

2. The system of claim 1 further comprising:
   sensing means for indicating when an aircraft is in proper position within the de-icing area for the first spraying boom and the first means for applying to apply de-icing solution to surfaces of the aircraft.

3. The system of claim 1 further comprising:
   means for collecting de-icing solution run-off.

4. The system of claim 3 further comprising:

means for recycling collected de-icing solution run-off, recycled de-icing solution run-off being stored for subsequent application to surfaces of aircraft.

5. A system for de-icing aircraft in a de-icing area, the system comprising:

a first recessed storage area, the first recessed storage area being located substantially below ground level on a first side of the de-icing area;

a first spraying boom for use in applying de-icing solution to surfaces of aircraft, the first spraying boom having at least one boom sections;

first means for applying de-icing solution to surfaces of aircraft, the first means for applying being supported by the first spraying boom;

means for raising the first spraying boom out of the first recessed storage area when an aircraft needs de-icing, the means for raising being connected to at least one first spraying boom section;

means for lowering the first spraying boom into the first recessed storage area for storage when aircraft de-icing is completed, the means for lowering being connected to at least one first spraying boom section;

means for receiving a first signal from an aircraft, the first signal identifying the model of the aircraft; and means for controlling movement of the first spraying boom and for controlling the first means for applying based upon the first signal so that surfaces of the aircraft are automatically de-iced.

6. The system of claim 5 further comprising:

sensing means for indicating when an aircraft is in proper position within the de-icing area for the first spraying boom and the first means, for applying to apply de-icing solution to surfaces of the aircraft.

7. The system of claim 5 further comprising:

means for collecting de-icing solution run-off.

8. The system of claim 7 further comprising:

means for recycling collected de-icing solution run-off, recycled de-icing solution run-off being stored for subsequent application to surfaces of aircraft.

9. The system of claim 5 wherein the de-icing area is a taxiway located immediately adjacent a take-off runway.

10. The system of claim 5 wherein the means for raising and the means for lowering comprise a boom support, the boom support being connected to a first boom section and being raisable out of the first recessed storage area for raising the first spraying boom and lowerable into the first recessed storage area for lowering the first spraying boom.

11. The system of claim 5 further comprising:

a second recessed storage area, the second recessed storage area being located substantially below ground level on a second side of the de-icing area;

a second spraying boom for use in applying de-icing solution to surfaces of aircraft, the second spraying boom having at least one boom section;

second means for applying de-icing solution to surfaces of aircraft, the second means for applying being supported by the second spraying boom;

means for raising the second spraying boom out of the second recessed storage area when an aircraft needs de-icing, the means for raising being connected to at least one second spraying boom section; and means for lowering the second spraying boom into the second recessed storage area for storage when aircraft de-icing is completed, the means for lowering being connected to at least one second spraying boom section.

12. A system for de-icing aircraft in a de-icing area, the system comprising:

a first recessed storage area, the first recessed storage area being located substantially below ground level on a first side of the de-icing area;

a first spraying boom for use in applying de-icing solution to surfaces of aircraft, the first spraying boom having at least one boom sections;

first means for applying de-icing solution to surfaces of aircraft, the first means for applying being supported by the first spraying boom;

means for raising the first spraying boom out of the first recessed storage area when an aircraft needs de-icing, the means for raising being connected to at least one first spraying boom section;

means for lowering the first spraying boom into the first recessed storage area for storage when aircraft de-icing is completed, the means for lowering being connected to at least one first spraying boom section; and a first cover for covering the first recessed storage area while the first spraying boom is stored in the first recessed storage area.

13. The system of claim 12 further comprising:

sensing means for indicating when an aircraft is in proper position within the de-icing area for the first spraying boom and the first means for applying to apply de-icing solution to surfaces of the aircraft.

14. The system of claim 12 further comprising:

means for receiving a first signal from an aircraft, the first signal identifying the model of the aircraft; and means for controlling movement of the first spraying boom and for controlling the first means for applying based upon the first signal so that surfaces of the aircraft are automatically de-iced.

15. The system of claim 12 further comprising:

means for collecting de-icing solution run-off.

16. The system of claim 15 further comprising:

means for recycling collected de-icing solution run-off, recycled de-icing solution run-off being stored for subsequent application to surfaces of aircraft.

17. A system for de-icing aircraft on a taxiway before take-off, the system comprising:

a first spraying boom for use in applying de-icing solution to surfaces of aircraft, the first spraying boom having a first boom section;

a second spraying boom for use in applying de-icing solution to surfaces of aircraft, the second spraying boom having a first boom section;

first spray means for applying de-icing solution to surfaces of aircraft, the first spray means being mounted on the first spraying boom;

second spray means for applying de-icing solution to surfaces of aircraft, the second spray means being mounted on the second spraying boom;

a first boom storage compartment for housing the first spraying boom when an aircraft is not being de-iced, the first boom storage compartment being located substantially below ground level on a first side of the taxiway;

a second boom storage compartment for housing the second spraying boom when an aircraft is not being de-iced, the second boom storage compartment being located substantially below ground level on a second side of the taxiway;

first boom support means for raising the first spraying boom out of the first boom storage compartment when an aircraft needs de-icing and for lowering the first spraying boom into the first boom storage compartment when aircraft de-icing is complete, the first boom support means being movably connected to the first boom section of the first spraying boom, the first boom support means comprising at least one piston/cylinder combination; and second boom support means for raising the second spraying boom out of the second boom storage compartment when an aircraft needs de-icing and for lowering the second spraying boom into the second boom storage compartment when aircraft de-icing is complete, the second boom support means being movably connected to the first boom section of the second spraying boom, the second boom support means comprising at least one piston/cylinder combination.

18. A system for de-icing aircraft on a taxiway before take-off, the system comprising:

a first spraying boom for use in applying de-icing solution to surfaces of aircraft, the first spraying boom having a first boom section;

a second spraying boom for use in applying de-icing solution to surfaces of aircraft, the second spraying boom having a first boom section;

first spray means for applying de-icing solution to surfaces of aircraft, the first spray means being mounted on the first spraying boom;

second spray means for applying de-icing solution to surfaces of aircraft, the second spray means being mounted on the second spraying boom;

a first boom storage compartment for housing the first spraying boom when an aircraft is not being de-iced, the first boom storage compartment being located substantially below ground level on a first side of the taxiway;

a second boom storage compartment for housing the second spraying boom when an aircraft is not being de-iced, the second boom storage compartment being located substantially below ground level on a second side of the taxiway;

first boom support means for raising the first spraying boom out of the first boom storage compartment when an aircraft needs de-icing and for lowering the first spraying boom into the first boom storage compartment when aircraft de-icing is complete, the first boom support means being movably connected to the first boom section of the first spraying boom, the first boom support means comprising a first boom base, the first boom base being raisable out of the first boom storage compartment for raising the first spraying boom and being lowerable into the first boom storage compartment for lowering the first spraying boom; and second boom support means for raising the second spraying boom out of the second boom storage compartment when an aircraft needs de-icing and for lowering the second spraying boom into the second boom storage compartment when aircraft de-icing is complete, the second boom support means being movably connected to the first boom section of the second spraying boom, the second boom support means comprising a second boom base, the second boom base being raisable out of the second boom storage compartment for raising the second spraying boom and being lowerable into the second boom storage compartment for lowering the second spraying boom.

19. The system of claim 18 further comprising:

sensing means for indicating when an aircraft is in proper position on the taxiway for the first and second spraying booms and the first and second spray means to apply de-icing solution to surfaces of the aircraft.

20. The system of claim 18 further comprising:

means for receiving a first signal from an aircraft, the first signal identifying the model of the aircraft; and means for controlling movement of the first and second spraying booms based upon the first signal so that surfaces of the aircraft are automatically de-iced.

21. The system of claim 18 further comprising:

means for collecting de-icing solution run-off.

22. The system of claim 21 further comprising:

means for recycling collected de-icing solution run-off, recycled de-icing solution run-off being stored for subsequent application to surfaces of aircraft.

* * * * *

UNITED STATES PATENT AND TRADEMARK OFFICE
CERTIFICATE OF CORRECTION

PATENT NO. : 5,354,014

DATED : October 11, 1994

INVENTOR(S) : THOMAS M. ANDERSON

It is certified that error appears in the above-indentified patent and that said Letters Patent is hereby corrected as shown below:

On the Title Page of the Patent, delete

[73] Assignee: Schwing America, Inc., Minneapolis, Minn.

Col. 1, line 27, before "taxiway", insert --a--

Col. 7, line 11, delete "sections", insert --section--

Col. 7, line 33, after "first means," delete ","

Col. 8, line 10, delete "sections", insert --section--

Signed and Sealed this

Twenty-fifth Day of July, 1995

Attest:

BRUCE LEHMAN

Attesting Officer  Commissioner of Patents and Trademarks